United States Patent [19]

DeVera

[11] Patent Number: 4,544,702
[45] Date of Patent: Oct. 1, 1985

[54] MODIFIED IONIC ELASTOMER AND BLEND WITH NYLON

[75] Inventor: Nedie L. DeVera, Danbury, Conn.

[73] Assignee: Uniroyal, Inc., Middlebury, Conn.

[21] Appl. No.: 619,677

[22] Filed: Jun. 11, 1984

[51] Int. Cl.[4] .................... C08L 77/00; C08L 51/00
[52] U.S. Cl. ...................................... 525/66; 525/184
[58] Field of Search ................................ 525/66, 184

[56] References Cited

U.S. PATENT DOCUMENTS

| | | |
|---|---|---|
| 2,975,128 | 3/1961 | Scott . |
| 3,236,917 | 2/1966 | Natta et al. . |
| 3,264,371 | 8/1966 | Gruber et al. . |
| 3,388,186 | 6/1968 | Kray et al. . |
| 3,465,059 | 9/1969 | Seven et al. . |
| 3,471,426 | 10/1969 | Hafton et al. . |
| 3,484,403 | 12/1969 | Brunson et al. . |
| 3,498,941 | 3/1970 | Hafton et al. . |
| 3,639,502 | 2/1972 | Okazaki et al. . |
| 3,642,728 | 2/1972 | Canter . |
| 3,664,248 | 2/1972 | Liujk et al. . |
| 3,700,751 | 10/1972 | Mueller et al. . |
| 3,796,771 | 3/1974 | Owens et al. . |
| 3,836,511 | 9/1974 | O'Farell et al. . |
| 3,845,163 | 10/1974 | Murch . |
| 3,847,854 | 11/1974 | Canter et al. . |
| 3,862,265 | 1/1975 | Steinkamp et al. . |
| 3,873,643 | 3/1975 | Wu et al. . |
| 3,880,948 | 4/1975 | Chompkoff . |
| 3,884,882 | 5/1975 | Caywood . |
| 4,010,223 | 3/1977 | Caywood . |
| 4,026,967 | 5/1977 | Flexman et al. . |
| 4,174,358 | 11/1979 | Epstein . |
| 4,251,644 | 2/1981 | Joffrion . |
| 4,404,317 | 9/1983 | Epstein . |
| 4,448,934 | 5/1984 | Weaver ............................ 525/184 |

FOREIGN PATENT DOCUMENTS 998439 7/1965 United Kingdom .

Primary Examiner—Lewis T. Jacobs
Assistant Examiner—A. L. Carrillo
Attorney, Agent, or Firm—John A. Shedden; William E. Dickheiser

[57] ABSTRACT

Adduct of an unsaturated dicarboxylic acid or ester (e.g., maleic anhydride) and neutralized sulfonated EPDM is an ionic elastomer useful as an impact-modifier for nylon.

15 Claims, 2 Drawing Figures

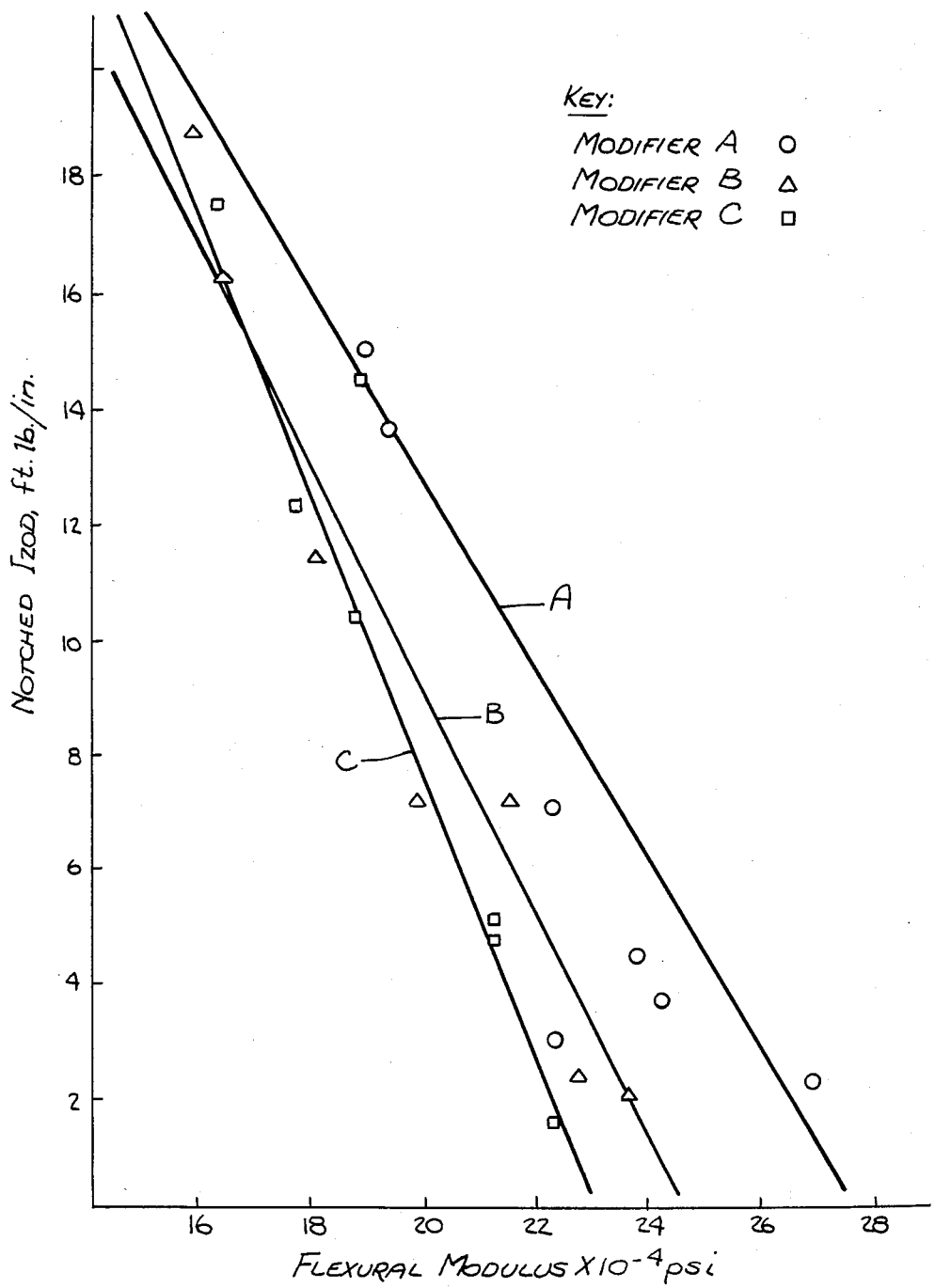

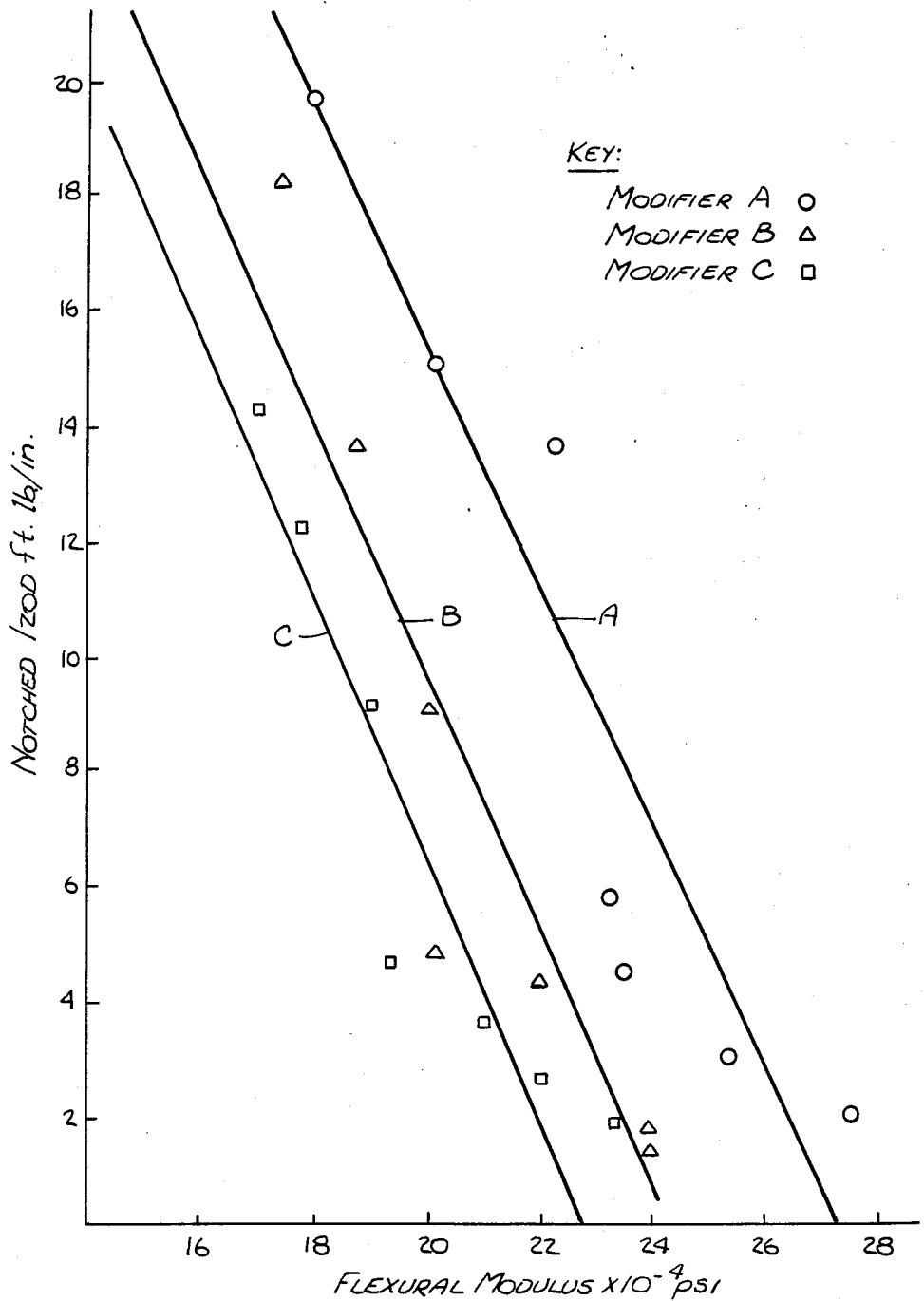

MODIFIED IONIC ELASTOMER AND BLEND WITH NYLON

This invention relates to a modified ionic elastomer and to a blend of such modified ionic elastomer with nylon.

More particularly, the invention relates to neutralized sulfonated EPDM elastomer modified so as to contain carboxylic moieties, as well as to a blend of such modified elastomer with nylon.

It has long been desired to improve the impact strength of nylon. Thus, in U.S. Pat. No. 4,174,358, Epstein, Nov. 13, 1979 nylon is blended with various polymers, including acid modified copolymers of ethylene, to make a tough composition. Also, U.S. Pat. No. 4,448,934, Weaver, May 15, 1984, discloses tough blends of nylon with neutralized sulfonated EPDM and a preferential plasticizer.

The present invention is based on the discovery that a new ionic elastomer, which is a neutralized sulfonated EPDM adduct with a carboxylic type modifier, is highly useful for blending with nylon. Nylon blended with the neutralized sulfonated EPDM/carboxyl-type adduct of the invention has an improved balance of impact strength and flexural modulus compared to prior art nylon blends employing EPDM/carboxyl adduct, or employing sulfonated EPDM/plasticizer.

The invention will be described with reference to the accompanying drawings, wherein:

FIG. 1 is a graph showing the relationship between flexural modulus and notched Izod impact strength at $-40°$ F. for blends of nylon 6 with various modifiers; and FIG. 2 is a similar graph for blends of nylon 6/6.

In U.S. Pat. Nos. 3,884,882, May 10, 1975 and 4,010,223, Mar. 1, 1977, Caywood, Jr., adducts containing succinic groups attached to EPDM type elastomers are described. The present invention is directed to a new adduct in which the succinic acid groups are attached to EPDM which has been sulfonated and neutralized. In one aspect, the invention is based on the discovery of the unexpectedly superior utility of this novel adduct as a modifier for nylon.

The modified elastomer of the invention may be described as an ionic elastomeric adduct containing carboxylic groups, which is a neutralized sulfonated EPDM type elastomer (copolymer of ethylene, an alpha-olefin having from 3 to 10 carbon atoms and a copolymerizable non-conjugated diene such as 5-ethylidene-2-norbornene, dicyclopentadiene, 1,4-hexadiene, etc.), said adduct having succinic acid groups attached thereto, the sulfonic acid content being from 1 to 30 milliequivalents per 100 grams, and the carboxylic content calculated as maleic anhydride being from 0.1 to 10% based on the total weight of the elastomer.

The modified ionic elastomer of the invention is produced by reacting neutralized, sulfonated EPDM with a carboxylic-type modifier, notably an unsaturated dicarboxylic acid or anhydride and/or a monoester or diester thereof. Particularly valuable as a modifier is maleic anhydride, although maleic acid, fumaric acid, etc., and/or their esters may be used.

The modified elastomer of the invention displays an infrared spectrum which shows carbonyl stretching bands characteristic of succinic anhydride, carboxylic acid and carboxylic anion. Thus, the infrared spectrum of the adduct of maleic anhydride with neutralized sulfonated EPDM shows carbonyl stretching bands at 1865 (weak), 1782 (strong), 1730 (strong), 1710 (strong) and 1575 cm$^{-1}$ (broad, strong). The set of bands at 1865 and 1782 cm$^{-1}$ is characteristic of succinic anhydride. Stretching bands at 1730 and 1710 cm$^{-1}$ are characteristic of carboxylic acid groups. The very intense and broad band at 1575 cm$^{-1}$ is characteristic of carboxylic anion. Its intensity is several times the magnitude of the acetate band found in the starting neutralized sulfonated EPDM. Unsaturated di-acids such as maleic anhydride, fumaric acid, and/or their mono-esters or di-esters can also add to the neutralized sulfonated EPDM to produce an identical or nearly identical adduct containing succinic anhydride carboxylic acid and/or carboxylic ester and carboxylic anion.

The neutralized sulfonated EPDM elastomer which is used to make the adduct of the invention is in itself well known and may be prepared for example as taught in U.S. Pat. Nos. 3,642,728, Canter, Feb. 15, 1972, and 3,836,511, O'Farell et al, Sept. 17, 1974, which are incorporated herein by reference. The olefinic unsaturation sites of the elastomer are sulfonated to form an acidic sulfonated elastomeric polymer. Sulfonation may be performed by means of a complex sulfur trioxide donor or a Lewis base. A preferred sulfonation agent is acetyl sulfate. Frequently the sulfonic acid content of the sulfonated EPDM is from 1 to 30 milliequivalents per 100 grams, preferably from 2 to 20 milliequivalents. The higher the sulfonic acid content (e.g., 25 milliequivalents or more) the more difficult it is to process such sulfonated elastomer. The sulfonate groups may be readily neutralized by a basic material at room temperature to form ionically crosslinked elastomers. The basic material used as a neutralizing agent may be selected from organic amines or basic materials selected from groups 1 through 8 of the Periodic Table or mixtures thereof. A preferred neutralizing agent is zinc acetate.

The EPDM used as a starting material in making the sulfonated intermediate may be described as an unsaturated copolymer of at least two different monoolefins, usually ethylene and another alpha-olefin, ordinarily propylene, with a copolymerizable non-conjugated diene such as 5-ethylidene-2-norbornene (ENB), dicyclopentadiene (DCPD), 1,4-hexadiene (1,4 HD), etc. The starting EPDM ordinarily has an iodine number of from 2 to 30 and an ethylene content of 30–80% by weight.

To prepare the maleic anhydride adduct of the sulfonated EPDM elastomer, the sulfonated EPDM is masticated at elevated temperature with maleic anhydride. For example, the (neutralized) sulfonated EPDM elastomer and maleic anhydride may be worked together in a suitable mixer such as an internal (Banbury; trademark) mixer or an extruder-mixer (e.g., a single screw or twin screw extruder). Reaction temperatures of from about 100° C. to 350° C. are ordinarily suitable. The amount of maleic anhydride employed is typically from about 0.2 to 20%, based on the weight of the sulfonated EPDM. Only a portion of the maleic anhydride becomes chemically attached to the sulfonated EPDM; unreacted maleic anhydride may be removed by application of reduced pressure. The maleic anhydride content of the product is frequently 0.1 to 10%, preferably 0.3 to 5%, based on the weight of the product. Similarly, adducts of maleic acid, fumaric acid, and/or esters thereof, may be prepared according to the procedure of U.S. Pat. No. 4,010,223, but substituting neutralized sulfonated EPDM for the unsulfonated EPDM used in that patent.

As indicated, an important aspect of the invention resides in blends of the described modified ionic elastomer (neutralized sulfonated EPDM modified so as to contain carboxylic moieties) with nylon. The blends of this invention comprise from 3 to 40 parts by weight, preferably 15 to 30 parts, of carboxylic modified sulfonated EPDM elastomers, per 100 parts by weight of the total composition. Most preferred compositions contain from 18% to 25% of the carboxylic modified sulfonated EPDM.

With respect to the nylon materials employed, these are well known in the art and include semi-crystalline and amorphous resins having molecular weight of at least 5,000. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include poly(hexamethylene adipamide) (66 nylon), poly(hexamethylene subacamide) (610 nylon), and poly(hexamethylene dodecanoamide) (612 nylon), the polyamide produced by ring opening of lactams, i.e., polycaprolactam, polylauric lactam, poly-11-aminoundecanoic acid, bis(paraaminocyclohexyl)methane dodecanamide. It is also possible to use in this invention polyamides prepared by the copolymerization of two of the above polymers or terpolymerization of the above polymers or their components, e.g., an adipic acid-isophthalic acid-hexamethylenediamine terpolymer. Preferably the polyamides are linear with a melting point in excess of 200° C. The term "nylon" as used herein refers to polyamides containing conventional compounding ingredients as are known to those skilled in the art.

A Banbury mixer may be conveniently used for forming the blends of the invention. In the case of compositions with high nylon concentrations, an extruder is preferred. The product from the Banbury mixer or the extruder, as the case may be, is chilled, cut into pellets and, after drying, molded. It should be understood that other blending techniques may be used. It is important that the mixer be operated at a temperature of 5° to 20° F. hotter than the melting point of the nylon. Such mixers may be screw-injection molding machines, compounding extruders, plastics extruders, or other shear mixers known to those skilled in the art. Dispersion and compatibility are necessary to obtain maximum impact of the finished product. Some improvement can be obtained even in low shear mixing, but this is not preferred. To obtain the best quality compositions, both the nylon and the elastomer should be dried before compounding or processing. Additionally, a nitrogen blanket is helpful to preserve color and retard degradation.

The following example will serve to illustrate the practice of the invention in more detail.

EXAMPLE 1

In this example the effects of seven different modifiers (designated Modifiers A, B, C, D, E, F and G in Table I below) on nylon are compared.

Modifier A is used in compositions 1, 4 and 11 in Table II below and illustrates the practice of the invention. Modifiers B, C, D, E, F and G used in compositions 2, 3, 5, 6, 7, 8, 9, 10 and 12 in Table II are outside the scope of the invention and are shown for purposes of comparison only.

To prepare Modifier A, 100 parts of neutralized sulfonated EPDM (sulfonation 10 meq/100 g EPDM, prepared according to U.S. Pat. No. 3,836,511 by reacting acetyl sulfate with ethylene [49%]-propylene [46%]-ENB [5% by wt.] terpolymer of Mooney viscosity [ML-4] 46 at 100° C., and subsequently neutralizing with zinc acetate) was mixed with 4 parts of maleic anhydride in a polyethylene bag and fed into a Werner & Pfleiderer 30 mm twin screw extruder. The feedport was nitrogen blanketed, and the barrel section under the feedport was water cooled. Temperature profile of the extruder was as follows.

| Zone 1 | 2 | 3 | 4 | 5 |
|--------|-----|-----|-----|-----|
| 200° C. | 250° | 300° | 250° | 200° |

A vacuum vent was set one barrel section upstream from the die and operated at 5 mm Hg to evacuate the unreacted maleic anhydride (estimated 50% of the starting material). The resulting maleic anhydride adduct of sulfonated EPDM is a product of the invention.

To prepare Modifier B, one hundred parts of EPDM (ENB-type, iodine number 10 [same EPDM as in A]) was ground, dusted with polyethylene and mixed with four parts of powdered maleic anhydride. The mixture was fed into a 30 mm twin screw extruder under the same conditions as in the preparation of Modifier A.

Modifier C was prepared in a manner analogous to Modifier B using an ENB-type EPDM having iodine number 20, Mooney viscosity 66 ML-4 at 125° F.

Modifiers D and E are also neutralized sulfonated EPDM used without reaction with maleic anhydride. (Modifier D is the same neutralized sulfonated EPDM that was used to prepare Modifier A; Modifier E is similar except that the sulfonation is 20 meq./100 g.)

Modifier F is the same as Modifier D with 7% zinc stearate added.

Modifier G is Modifier E with 7% zinc stearate.

Preparation of Nylon Blends

Nylon 6/6, 6 or 11 was blended with Modifiers A through G according to the following procedure. The nylon resin and modifier were fed together into a Werner & Pfleiderer 30 mm twin screw extruder equipped with a strand die and pelletizer. The feedport was blanketed with nitrogen. The temperature profile of the extruder was as follows:

| Nylon | Zone 1 | 2 | 3 | 4 | 5 |
|-------|--------|-----|-----|-----|-----|
| 6/6 | 250° C. | 265 | 270 | 260 | 250 |
| 6 | 210 | 230 | 230 | 230 | 220 |
| 11 | 195 | 210 | 200 | 200 | 200 |

A vacuum port was set one barrel section upstream from the die to evacuate moisture and other volatile material at 5 mm Hg.

Mechanical properties [notched Izod impact at room temperature (NI at RT) and −40° C. (NI at −40° C.), flexural modulus, at room temperature, and Rockwell hardness] were obtained from injection molded specimens.

Table II compares the mechanical properties of nylon blends prepared at 20% modifier level (20 parts modifier, 80 parts nylon). Experiments 1, 4 and 11, are within the invention, whereas Experiments, 2, 3, 5, 6, 7, 8, 9, 10 and 12 are for comparison purposes. Note that nylon 6 and 6/6 blended with modifier A (experiments 1 and 4) have higher flexural moduli than corresponding samples modified with B or C (experiments 2, 3, 5 and 6).

Comparison of notched Izod at −40° F. also shows that nylon 6/6 and nylon 11 blends of Modifier A have better impact at low temperature. Comparison of notched Izod at room temperature shows that modifiers D, E, and G are ineffective in improving the impact of nylon 6/6.

TABLE I

| Modifier | Description |
|---|---|
| A | Maleic anhydride bound to neutralized sulfonated EPDM (ca. 10 meg. sulfonation/100 g EPDM) |
| B | Maleic anhydride bound to EPDM, Iodine No. 10. |
| C | Maleic anhydride bound to EPDM, Iodine No. 20. |
| D | Neutralized sulfonated EPDM (10 meq. sulfonation/100 g EPDM) |
| E | Neutralized Sulfonated EPDM (25 meq. sulfonation/100 g EPDM) |
| F | Modifier D plus 7% zinc stearate. |
| G | Modifier E plus 7% zinc stearate. |

TABLE II

| Experiment | 1 | 2 | 3 | 4 | 5 | 6 |
|---|---|---|---|---|---|---|
| Nylon 6 | v | v | v | — | — | — |
| 6/6 | — | — | — | v | v | v |
| 11 | — | — | — | — | — | — |
| Modifier | | | | | | |
| A | v | — | — | v | — | — |
| B | — | v | — | — | v | — |
| C | — | — | v | — | — | v |
| D | — | — | — | — | — | — |
| E | — | — | — | — | — | — |
| F | — | — | — | — | — | — |
| G | — | — | — | — | — | — |
| Hardness | 104 | 105 | 104 | 108 | 108 | 107 |
| NI at RT | 6.2 | 12 | 11.6 | 16.7 | 14.1 | 16.9 |
| NI at −40 | 3.6 | 2.2 | 4.7 | 3.0 | 1.3 | 2.6 |
| Flex. Mod. | 242 | 227 | 211 | 255 | 240 | 221 |

| Experiment | 7 | 8 | 9 | 10 | 11 | 12 |
|---|---|---|---|---|---|---|
| Nylon 6 | — | — | — | — | — | — |
| 6/6 | v | v | v | v | — | — |
| 11 | — | — | — | — | v | v |
| Modifier | | | | | | |
| A | — | — | — | — | v | — |
| B | — | — | — | — | — | — |
| C | — | — | — | — | — | v |
| D | v | — | — | — | — | — |
| E | — | v | — | — | — | — |
| F | — | — | v | — | — | — |
| G | — | — | — | v | — | — |
| Hardness | 107 | 107 | 104 | 106 | 87 | 85 |
| NI at RT | 0.85 | 1.1 | 1.4 | 0.4 | 17 | 16.5 |
| NI at −40 | — | — | — | — | 15.9 | 13 |
| Flex. Mod. | — | — | — | — | 117 | 127 |

EXAMPLE 2

Following essentially the procedure of Example 1 additional blends were prepared using Nylon 6/6 polyamide at various concentrations of modifiers of Table I. The blends and their physical properties are summarized in Table III. Experiment 13 represents the invention whereas Experiments 14–19 are outside the scope.

The data clearly indicate that employing the modifier of this invention provides polyamide having excellent impact strength at exceptionally high flexural modulus values. These results are unexpected because it is commonly known that the higher the flexural modulus the stiffer the material and the lower the impact strength. The modifier of this invention allows improvement in impact strength without sacrificing flexural stability. Note that modifier A is more efficient in raising low temperature impact strength then either modifier B or C.

TABLE III

| | | Experiment | | | | | | |
|---|---|---|---|---|---|---|---|---|
| | | 13 | 14 | 15 | 16 | 17 | 18 | 19 |
| | % Modifier | MODIFIER | | | | | | |
| | | A | B | C | D | E | F | G |
| Rockwell Hardness | 18 | 109 | 110 | 108 | — | — | — | — |
| | 20 | 108 | 108 | 107 | 107 | 107 | 104 | 106 |
| | 22 | 105 | 105 | 105 | — | — | — | — |
| | 24 | 102 | 103 | 100 | — | — | — | — |
| | 26 | 101 | 101 | 99 | — | — | — | — |
| | 28 | 97 | 97 | 94 | — | — | — | — |
| | 30 | 91 | 93 | 92 | — | — | — | — |
| NI at RT | 18 | 15.2 | 12.8 | 15.7 | — | — | — | — |
| | 20 | 16.7 | 14.1 | 16.9 | 0.9 | 1.1 | 1.4 | 0.4 |
| | 22 | 18.4 | 16.9 | 17.8 | — | — | — | — |
| | 24 | 18.3 | 18.7 | 18.7 | — | — | — | — |
| | 26 | 18.8 | 18.7 | 19.5 | — | — | — | — |
| | 28 | 21.2 | 16.0 | 19.8 | — | — | — | — |
| | 30 | 19.8 | 18.8 | 20.3 | — | — | — | — |
| NI at −40° C. | 18 | 1.9 | 1.7 | 1.8 | — | — | — | — |
| | 20 | 3.0 | 1.3 | 2.6 | — | — | — | — |
| | 22 | 4.5 | 4.3 | 3.6 | — | — | — | — |
| | 24 | 5.7 | 4.8 | 4.7 | — | — | — | — |
| | 26 | 13.6 | 9.0 | 9.1 | — | — | — | — |
| | 28 | 15.0 | 13.6 | 12.2 | — | — | — | — |
| | 30 | 19.7 | 18.2 | 14.3 | — | — | — | — |
| Flex. Mod. ($\times 10^{-5}$) psi | 18 | 2.75 | 2.39 | 2.33 | — | — | — | — |
| | 20 | 2.54 | 2.39 | 2.20 | — | — | — | — |
| | 22 | 2.35 | 2.2 | 2.10 | — | — | — | — |
| | 24 | 2.32 | 2.08 | 1.93 | — | — | — | — |
| | 26 | 2.22 | 2.02 | 1.89 | — | — | — | — |
| | 28 | 2.04 | 1.86 | 1.77 | — | — | — | — |
| | 30 | 1.79 | 1.73 | 1.68 | — | — | — | — |

EXAMPLE 3

Employing Nylon 6 as the thermoplastic further blends were compounded and tested in accordance with Examples 1 and 2 (Experiment 20-invention; 21 and 22-outside invention). The results are disclosed in Table IV which further substantiate the improved impact strength obtainable using the modifier of this invention while maintaining high degree of flexural modulus.

TABLE IV

| | | Experiment | | |
|---|---|---|---|---|
| | | 20 | 21 | 22 |
| | | MODIFIER | | |
| | % Modifier | A | B | C |
| Rockwell Hardness | 18 | 107 | 107 | 107 |
| | 20 | 106 | 105 | 104 |
| | 22 | 104 | 102 | 104 |
| | 24 | 101 | 100 | 103 |
| | 26 | 99 | 96 | 98 |
| | 28 | 95 | 93 | 98 |
| | 30 | 91 | 85 | 95 |
| NI at RT | 18 | 5.3 | 10.7 | 10.3 |
| | 20 | 5.7 | 12.0 | 11.6 |
| | 22 | 5.6 | 13.6 | 14.0 |
| | 24 | 6.7 | 14.1 | 15.4 |
| | 26 | 6.9 | 19.1 | 16.5 |
| | 28 | 7.0 | 20.2 | 18.7 |
| | 30 | 7.0 | 20.3 | 19.6 |
| NI at −40° C. | 18 | 2.3 | 1.94 | 1.5 |

TABLE IV-continued

| | % Modifier | Experiment 20 A | 21 B (MODIFIER) | 22 C |
|---|---|---|---|---|
| | 20 | 2.9 | 2.3 | 4.7 |
| | 22 | 3.5 | 7.1 | 5.0 |
| | 24 | 6.2 | 7.1 | 10.4 |
| | 26 | 11.5 | 11.5 | 14.6 |
| | 28 | 11.2 | 16.3 | 12.4 |
| | 30 | 17.0 | 18.9 | 17.6 |
| Flex. Mod. ($\times 10^{-5}$) psi | 18 | 2.49 | 2.34 | 2.26 |
| | 20 | 2.39 | 2.26 | 2.11 |
| | 22 | 2.29 | 2.14 | 2.16 |
| | 24 | 2.31 | 1.98 | 1.87 |
| | 26 | 2.08 | 1.79 | 1.86 |
| | 28 | 1.94 | 1.63 | 1.76 |
| | 30 | 1.82 | 1.57 | 1.67 |

Referring to the drawings, FIGS. 1 and 2, which are plots showing the relationship between flexural modulus and notched Izod impact strength at −40° F., demonstrate that Modifier A of the invention results in blends having higher impact strength at a given modulus, both with nylon 6 (FIG. 1) and nylon 6/6 (FIG. 2), a most remarkable result of great practical importance.

What is claimed is:

1. A polymer blend which comprises an admixture of (a) from 60 to 97 parts by weight of nylon and (b) correspondingly from 40 to 3 parts by weight of an ionic elastomeric adduct containing carboxylic groups, which is a neutralized sulfonated copolymer of ethylene, an alpha-olefin having from 3 to 10 carbon atoms, and a copolymerizable non-conjugated diene, said adduct having succinic acid groups attached thereto, the sulfonic acid content being from 1 to 30 milliequivalents per 100 grams, and the carboxylic content calculated as maleic anhydride being from 0.1 to 10% based on the total weight of the elastomer.

2. A polymeric blend as in claim 1 in which the sulfonic acid content of the sulfonated copolymer is from 2 to 20 milliequivalents per 100 grams and the carboxylic content of the adduct calculated as maleic anhydride is from 0.3 to 5%.

3. A polymeric blend as in claim 1 in which the copolymer is an ethylene-propylene-ethylidene norbornene terpolymer.

4. A polymeric blend as in claim 1 containing from 75 to 82 parts of (a) and from 25 to 18 parts of (b).

5. A polymeric blend as in claim 4 in which the sulfonic acid content of the sulfonated copolymer is from 2 to 20 milliequivalents per 100 grams and the carboxylic content of the adduct calculated as maleic anhydride is from 0.3 to 5%.

6. A polymeric blend as in claim 4 in which the copolymer is an ethylene-propylene-ethylidene norbornene terpolymer.

7. A polymeric blend as in claim 4 in which the adduct is a reaction product of maleic anhydride with the sulfonated copolymer.

8. A polymeric blend as in claim 1 in which (a) is nylon 6.

9. A polymeric blend as in claim 1 in which (a) is nylon 6/6.

10. A polymeric blend as in claim 1 in which (a) is nylon 11.

11. A polymeric blend as in claim 6 in which (a) is nylon 6.

12. A polymeric blend as in claim 6 in which (a) is nylon 6/6.

13. A polymeric blend as in claim 6 in which (a) is nylon 11.

14. A method of preparing a polymeric blend composition which comprises mixing (a) from 60 to 97 parts by weight of nylon and (b) correspondingly from 40 to 3 parts by weight of an ionic elastomeric adduct containing carboxylic groups, which is a neutralized sulfonated copolymer of ethylene, an alpha-olefin having from 3 to 10 carbon atoms, and a copolymerizable non-conjugated diene, said adduct having succinic acid groups attached thereto, the sulfonic acid content being from 1 to 30 milliequivalents per 100 grams, and the carboxylic content calculated as maleic anhydride being from 0.1 to 10% based on the total weight of the elastomer.

15. A method of preparing a polymeric blend composition which comprises mixing (a) from 75 to 82 parts by weight of nylon and (b) correspondingly from 25 to 18 parts by weight of an ionic elastomeric adduct of maleic anhydride and neutralized sulfonated EPDM, the sulfonic acid content of the neutralized sulfonated EPDM being from 2 to 20 milliequivalents per 100 grams and the maleic anhydride content of the adduct being from 0.3 to 5% based on the weight of the adduct, the EPDM being an ethylene-propylene-ethylidene norbornene terpolymer and the nylon being selected from nylon 6, nylon 6/6 and nylon 11.

* * * * *